United States Patent [19]

Koch, Jr.

[11] 4,321,990

[45] Mar. 30, 1982

[54] HYDRODYNAMIC RETARDING BRAKE AND OIL-COOLED DRIVELINE CLUTCH

[75] Inventor: Franklin O. Koch, Jr., Edelstein, Ill.

[73] Assignee: Caterpillar Tractor Co., Peoria, Ill.

[21] Appl. No.: 205,826

[22] Filed: Nov. 10, 1980

Related U.S. Application Data

[63] Continuation of Ser. No. 945,958, Sep. 26, 1978, abandoned.

[51] Int. Cl.³ .................... F16D 67/04; F16D 13/72
[52] U.S. Cl. .................................. 192/13 R; 188/296;
192/4 B; 192/12 A; 192/18 A; 192/113 B
[58] Field of Search ............... 188/272, 271, 279, 296;
192/4 B, 12 R, 12 A, 12 C, 13 R, 18 A, 70.12,
113 B, 85 CA

[56] References Cited

U.S. PATENT DOCUMENTS

| | | | |
|---|---|---|---|
| 2,425,171 | 8/1947 | Bennett et al. | 188/296 |
| 2,750,009 | 6/1956 | Pohl | 188/296 |
| 3,185,261 | 5/1965 | Campbell et al. | 188/296 |
| 3,352,385 | 11/1967 | Johnson | 192/58 A X |
| 3,366,210 | 1/1968 | Webster | 192/70.12 X |
| 3,490,567 | 1/1970 | Clark et al. | 192/3 R |
| 3,526,304 | 9/1970 | Pearce et al. | 192/12 A X |
| 3,540,557 | 11/1970 | Hasselbacher et al. | 192/113 B X |
| 3,773,157 | 11/1973 | Koch et al. | 192/13 R X |
| 3,866,727 | 2/1975 | Myers | 192/13 R |
| 3,923,130 | 12/1975 | Eker | 192/12 A |
| 3,958,671 | 5/1976 | Muller | 188/296 X |
| 4,004,660 | 1/1977 | Shore et al. | 188/296 X |
| 4,077,500 | 3/1978 | Hickman et al. | 192/70.12 X |
| 4,142,619 | 3/1979 | Spokas | 192/13 R X |
| 4,199,047 | 4/1980 | Ling | 192/70.12 |

OTHER PUBLICATIONS

"Fluid Brake Controls Downhill Truck Speed", p. 122, Machine Design, Apr. 1954.

Primary Examiner—Rodney H. Bonck
Attorney, Agent, or Firm—Richard F. Phillips

[57] ABSTRACT

A combined hydrodynamic retarding brake and oil-cooled driveline flywheel clutch, the clutch (72) being integral with a retarding brake impeller (52) rotatable in a body of oil (58) contained within a housing (22) having a retarder flow circuit (118) therein, the amount of retardation being controllable by varying the amount of oil present in the circuit (118), the retarder impeller (52) operating to supply a flow of cooling oil through the clutch (72), and a clutch brake (102) operable to apply a braking action to the clutch, as the clutch (72) is disengaged operating to stop clutch output, and cut off oil flow to the clutch thereby reducing viscous drag at the clutch.

23 Claims, 5 Drawing Figures

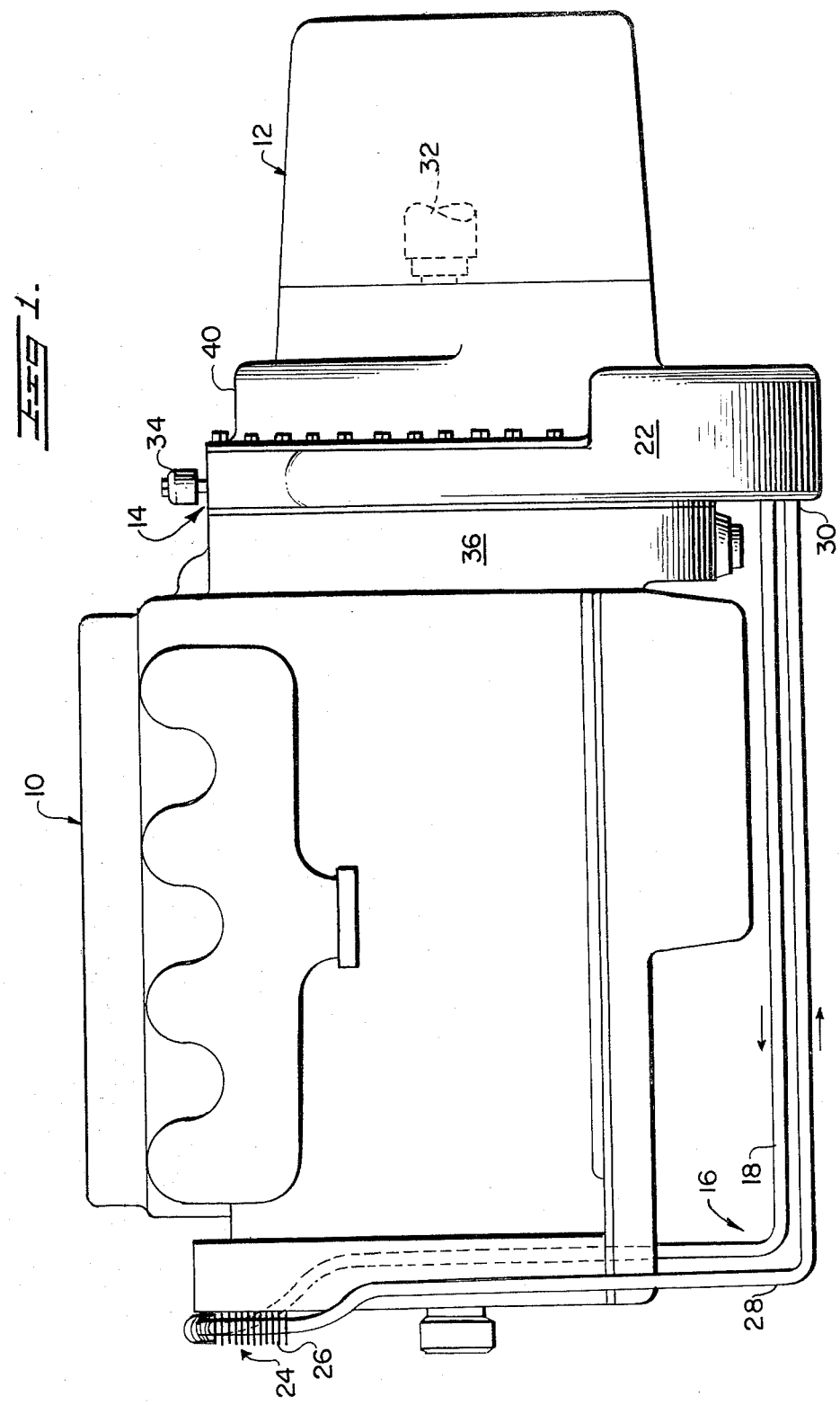

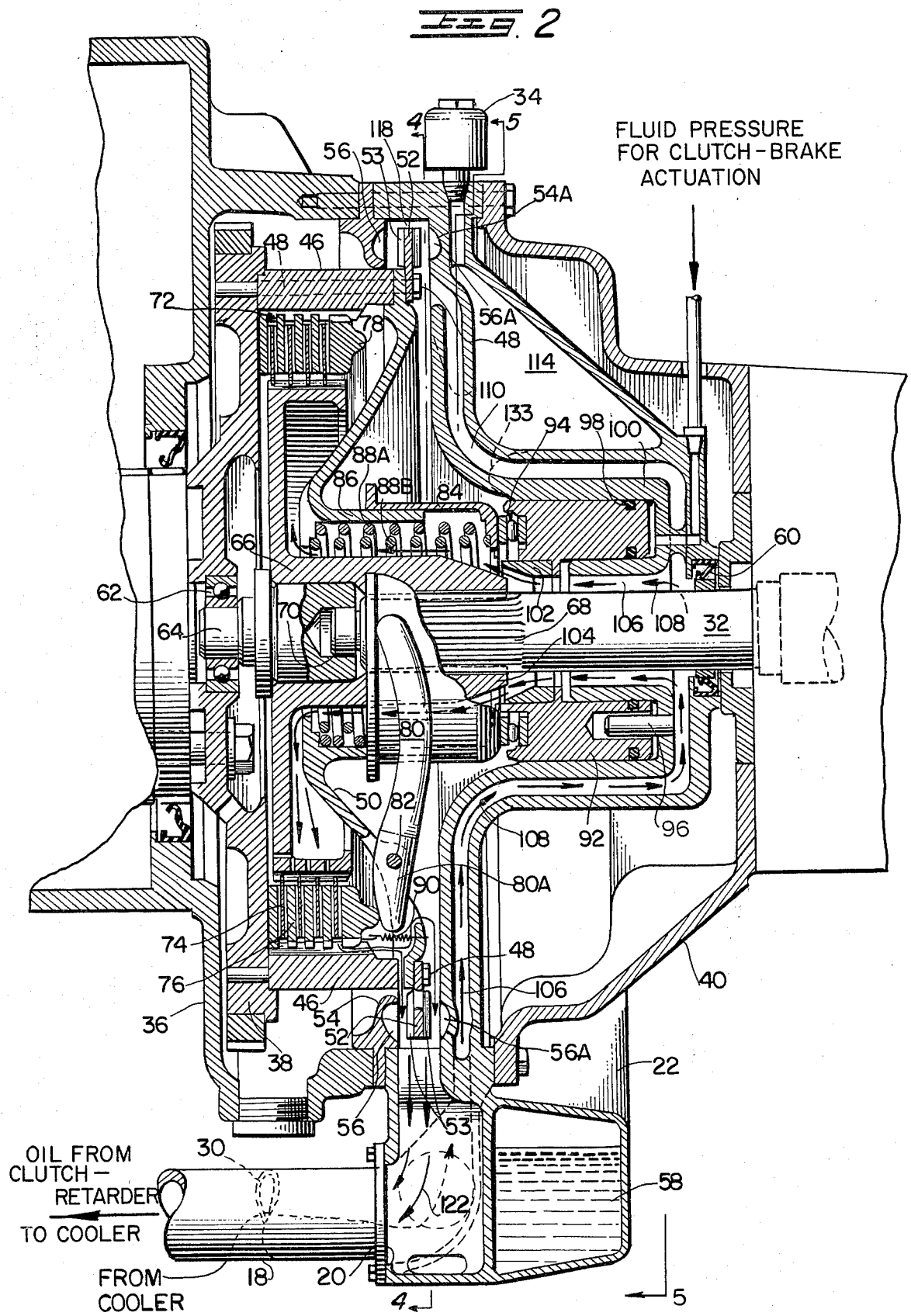

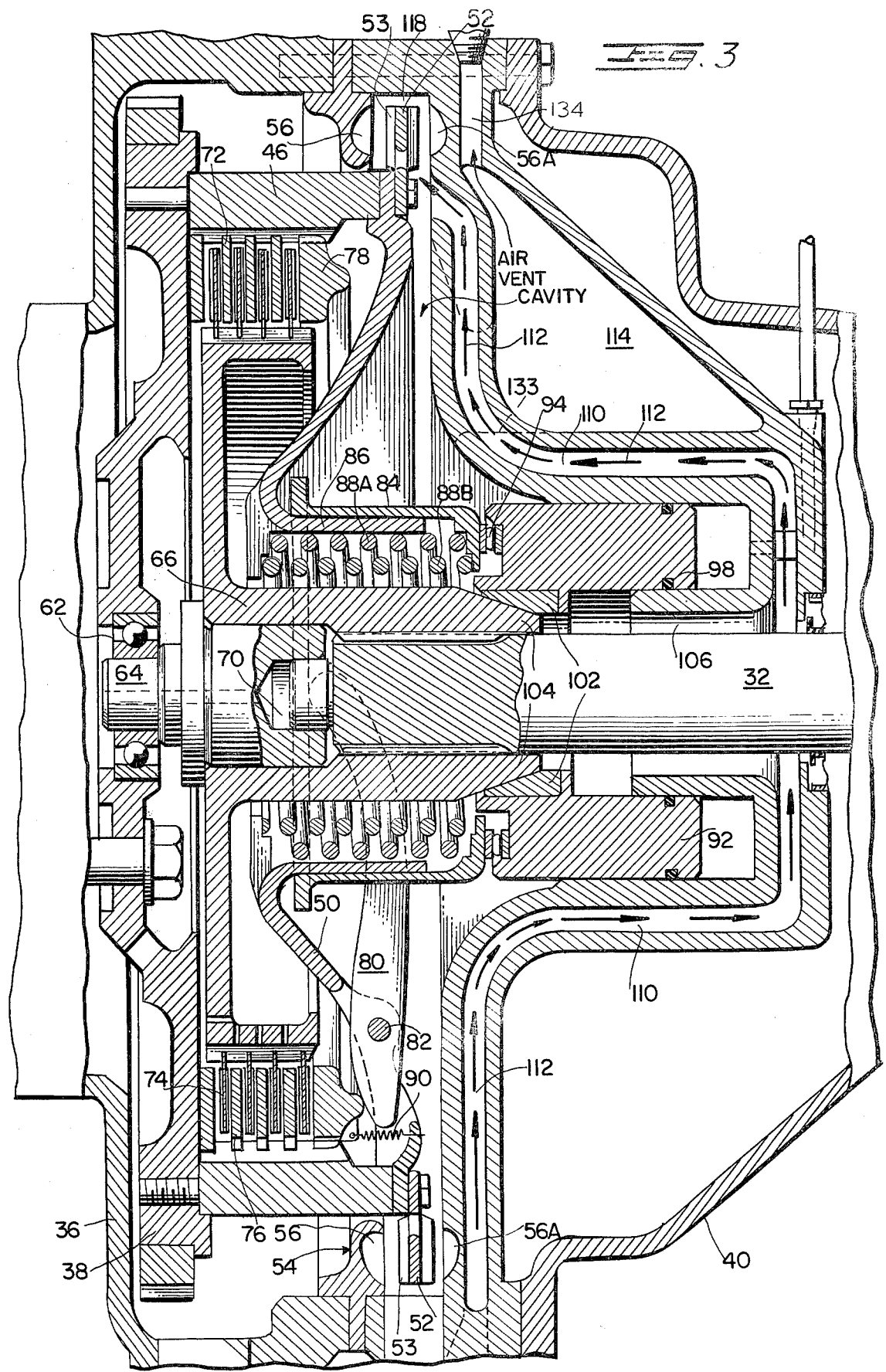

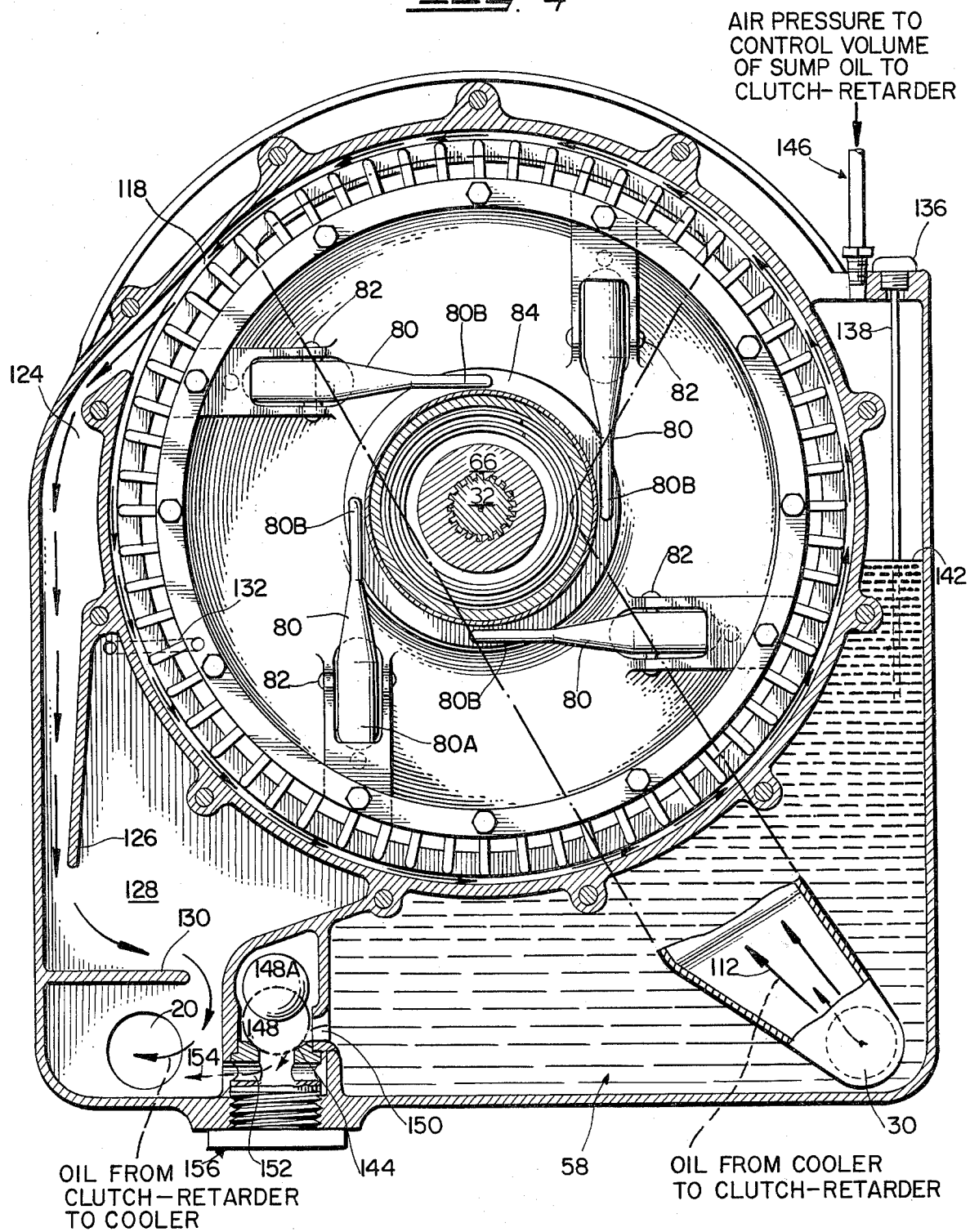

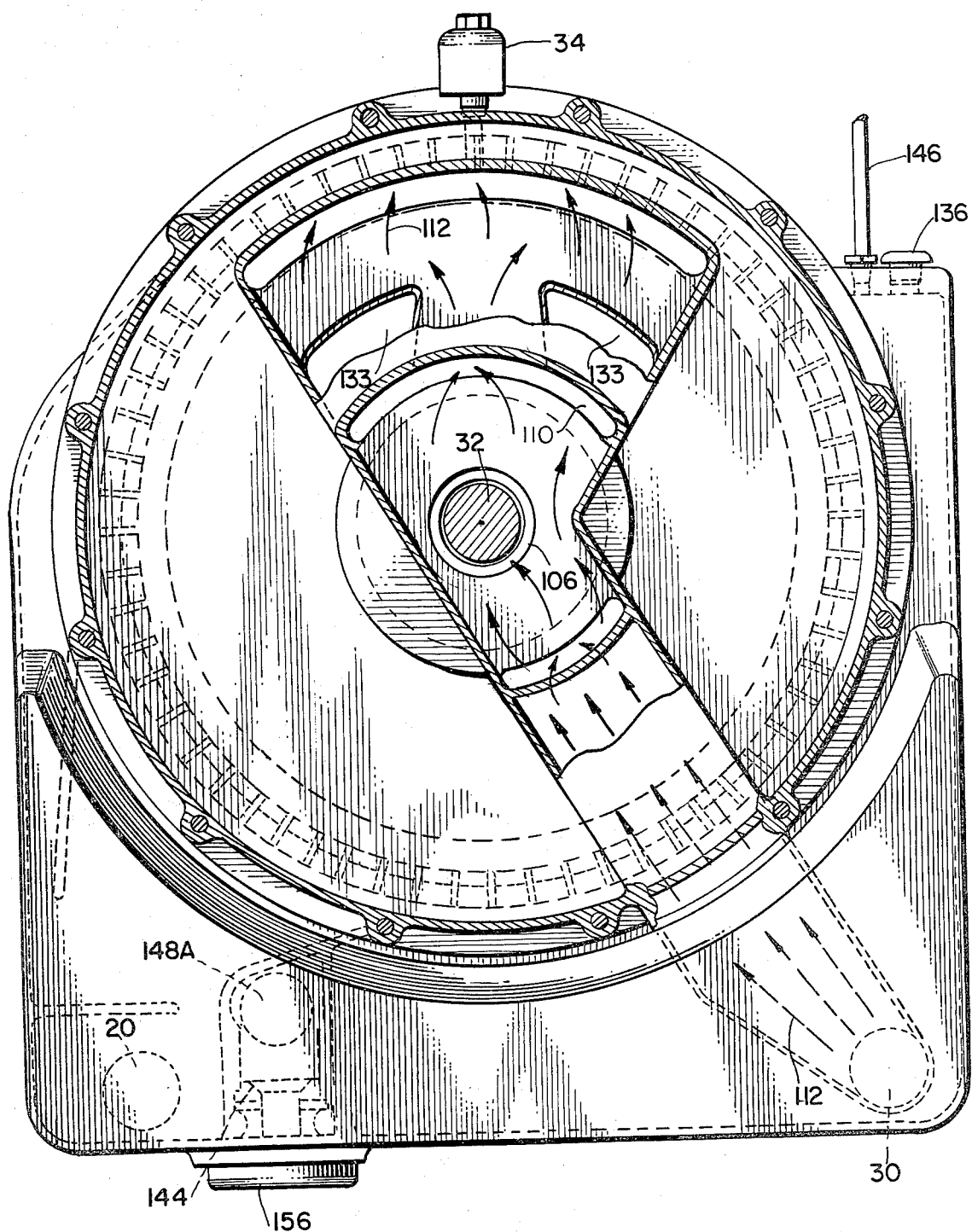

HYDRODYNAMIC RETARDING BRAKE AND OIL-COOLED DRIVELINE CLUTCH

CROSS-REFERENCE

This application is a continuation of application Ser. No. 945,958 filed on Sept. 26, 1978 and now abandoned.

TECHNICAL FIELD

This invention relates to a hydrodynamic retarding brake and oil-cooled driveline clutch, including a clutch retarder circuit, the amount of retardation being automatically controlled by oil quantity in a retarder circuit, and a hydrodynamic retarding brake and oil-cooled driveline clutch for vehicles with automatic implmentation of retardation amount, and flow of cooling oil to a clutch assembly.

BACKGROUND ART

Many vehicles, such as large earth moving vehicles, for example, frequently require braking systems over and above normal brakes to maintain safe and reasonable speeds while traveling down grades of various degrees and to decrease vehicle speed during vehicle operation. To this end so-called brake-saver mechanisms, in the nature of hydrokinetic brakes, have been utilized in conjunction with truck engines in vehicles.

Such structures in many instances have been complicated and comparatively expensive, and particularly as regards retarding capacities.

In applications requiring a flywheel clutch as used in many over the road trucks, cooling problems of the clutch exist, and previous designs in some instances have posed problems of expense and complex structure in the area of circuit sealing and control of retarding capacity.

In some previous structures utilizing an oil-cooled clutch, problems have occurred when the clutch is disengaged, and a clutch brake contacted to stop rotation of a clutch output member, in that high viscous drag at the clutch existed.

Hydrodynamic retarders for vehicles for effecting a selective braking thereof have previously been devised, and are currently in use by the assignee company of the present application. Apparatus of this nature is to be found in previous U.S. Pat. No. 3,352,385, Nov. 14, 1967, To Lowell E. Johnson and U.S. Pat. No. 3,490,567, Jan. 20, 1970, to Richard B. Clark et al, both being assigned to the assignee of the present application.

DISCLOSURE OF INVENTION

According to the present invention, apparatus is provided which is a simplified retarder, including its control means, having reduced manufacturing costs, and wherein the retarder is so combined with the clutch as to provide oil cooling thereto and reduced wear and maintenance.

In accomplishing this end result, a "simplified retarder" is provided inasmuch as the retarder cavity is not sealed from the clutch housing. The amount of retardation is controlled simply by varing the amount of oil which is present in the housing, and thus within a retarder circuit.

The invention has direct applicability for those applications requiring a flywheel clutch wherein an oil-cooled clutch can be integrated, and whereby a retarder impeller will supply a flow of cooling oil through the clutch, and the apparatus being operable when the clutch is disengaged, and a clutch brake contacted to stop rotation of the clutch output member, to cut off oil flow, thus reducing viscous drag at the clutch.

BRIEF DESCRIPTION OF DRAWINGS

FIG. 1 is a side elevational view of an internal combustion engine and transmission assembly, incorporating cooling means generally depicted, and of a type of which the present invention is applicable;

FIG. 2 is a fragmentary enlarged view, partly in section, of an embodiment of the invention, and generally depicting the overall system as applied to an internal combustion engine and transmission therefor, the mechanism disclosing a mode of operation wherein cooling oil is being directed from sump to the clutch mechanism;

FIG. 3 is an enlarged fragmentary sectional view, parts being broken away, disclosing the invention in a second mode of operation differing from that shown in FIG. 2, and disclosing a clutch brake engaged, with oil coolant passage to the clutch being discontinued, and with flow to the clutch blocked off, thereby minimizing oil drag within the clutch;

FIG. 4 is a sectional view through the clutch assembly, generally along line 4—4 of FIG. 2, disclosing some details of clutch actuating means and portions of the mechanism constituting a retarder circuit affecting clutch braking, and disclosing oil path flow; and FIG. 5 is a sectional view, generally along line 5—5 of FIG. 2, disclosing mechanism operable for controlling the quantity of oil in the clutch and retarder, and showing in greater detail the secondary oil flow passage of FIG. 3, and in essence constituting a rear view of the unit.

BEST MODE FOR CARRYING OUT THE INVENTION

Referring now in greater detail to the drawings, there is shown in FIG. 1 an engine 10 of a conventional internal combustion type which may suitably be mounted in a vehicle to selectively drive ground engaging wheels through a transmission generally indicated at 12. A hydrodynamic retarding assembly 14 is interposed between engine 10 and transmission 12, a housing incorporating such a hydrodynamic retarder assembly being shown at 22, and a hydraulic fluid cooling circuit is generally indicated at 16. The cooling circuit includes a conduit 18 leading from a port 20 in retarder housing 22 to the cooling section 24, having a plurality of cooling fins 26 mounted on the conduit in a known manner. A return conduit 28 recycles cooled oil into a retarder housing 22 through an inlet port at 30. FIG. 1 also discloses, in phantom, a portion of a transmission input shaft 32. A breather 34 is operatively positioned on the top of housing 22.

As shown in the drawing, the present invention is shown mounted directly to an engine having a flywheel housing 36, containing a flywheel 38. A transmission housing is shown at 40, and transmission input shaft 32 is connected in a usual manner with an output shaft (not shown) of the transmission.

The hydrodynamic retarder generally includes a clutch retarder drive ring 46 which is mounted to the flywheel 38 of the engine, being bolted thereto by bolts 48, along with a clutch cover 50 and a retarder impeller 52 having a plurality of blades 53 thereon. Two stationary reaction members for the retarder are shown at 54,54a having fixed vanes 56 and 56A respectively. Housing 22 also provides an oil sump 58 for the main retarder circuit of flow path, shown in FIG. 4.

The transmission 12 is directly bolted to the retarder housing 22 by means of transmission housing 40. The transmission input shaft 32 projects through an oil seal 60, which seals the retarder and clutch from the transmission.

A pilot bearing 62 is fitted into an opening in the central portion of the engine flywheel 38. Adapter 64 which is press fitted into clutch hub 66, pilots in bearing 62. The adapter becomes a part of an assembly with a clutch hub 66. The transmission input shaft 32 is connected and mates with the clutch hub 66 through splines 68, and is guided concentrically by a pilot bore 70 in adapter 64 and bearing 62.

A flywheel clutch is generally indicated at 72, which has a plurality of alternately arranged driving and driven plates 74, 76. The clutch 72 serves to connect first and second members such as the flywheel (38) and the transmission input shaft (32). A pressure plate 78 operably provides a load on the clutch plates by means of a lever system, including a plurality of levers 80, which are pivoted on pins or shafts 82. As shown in FIG. 2, the lower lever ends 80A, operatively engage with the pressure plate. The shafts 82 are mounted on clutch cover 50, with the lower ends oscillatably positioned in openings in the cover 50, the mounting being shown in greater detail in FIG. 4.

A clutch throw-out collar 84 is mounted to central boss portion 86 of clutch cover 50 by means of a sleeve surrounding a central opening in the cover 50. Interengaged between the collar 84 and cover 50 are two concentric springs 88a and 88b which provide the plate load on the clutch by engaging and pressing between the cover 50 and throw-out collar 84. The throw-out collar 84, in turn, bears against the central or inner ends 80b of levers 80, also shown in FIG. 4. Functionally, when the clutch is released, the springs 88a, 88b are compressed, relieving the load on levers 80. Tension springs 90 thereupon act to pull pressure plate 78 away from the clutch plates.

In the particular mechanism disclosed, an annular clutch piston 92 is operable to be moved toward the clutch assembly, i.e., to the left in the figures of the drawings, by pressure which can be either air or hydraulic, and in turn movement of this piston 92 pushes against throw-out bearing 94, and this in turn moves clutch throw-out collar 84 toward the flywheel 38 to cause clutch disengagement.

As will be understood, movement of the collar releases pressure on the inner ends 80b of the levers 80, and the outer ends 80a pivot away from pressure plate 78. Guide pins 96 prevent rotation of the annular clutch piston 92, and this piston has seal rings 98 to seal it within cylindrical portion 100 of retarder housing 22.

In operation, when piston 92 has moved leftwardly a sufficient distance to disengage the clutch, by disengagement of the plates 74 and 76, an internally conical shaped end of a clutch-brake mechanism 102 comes into contact with a conical nose portion 104 on clutch hub 66. This applies a braking action to slow rotation of the clutch output members, and this serves as an aid in shifting of gears within the transmission in a known manner.

During normal operational periods, a flow of cooling oil is directed to the clutch through annular passage 106 as indicated by arrows 108. When, however, the clutch is sufficiently disengaged and the clutch brake is engaged, cooling oil flow to the clutch is blocked off by engagement of brake 102 with nose portion 104 of clutch hub 66, and this minimizes oil drag within the clutch. When this occurs, the oil is directed to, and passes through a secondary passage 110 (FIG. 3) with the flow of oil therethrough indicated by arrows 112. The secondary passage, and the oil passing therethrough, bypasses the clutch and is pumped out of the housing by retarder impeller 52. When the clutch piston 92 again moves in the reverse direction, or outwardly from the clutch assembly, the brake opens and oil is again permitted to flow to the clutch prior to its engagement, again through the channel or passageway 106. An air vent cavity or space 114. FIG. 3, is provided with passages 133 leading through the clutch housing and via passage 134 to breather 34 at the top of the housing.

The degree or amount of retardation imparted by the apparatus, and power absorption by the retarder, is controlled by the amount of oil which is retained in the retarder circuit. As the quantity of oil is increased in the apparatus, blades 53 on retarder impeller 52 accelerate oil flow toward circuit 118 which is volute shaped at the periphery of the impeller and this imparts kinetic energy to the flowing oil. A somewhat similar structure is shown in U.S. Pat. Nos. 3,352,385 and 3,490,567 referred to hereinabove. The pressure produced in this volute space causes the oil to flow inward along fixed vanes 56 and 56a which are a part of the fixed reaction members 54 and 54a. Kinetic energy is removed from the oil as its tangential velocity is impeded while following the fixed vanes 56 and 56a from the outer diameter (O.D.) to the inner diameter (I.D.), where it impinges upon impeller blades 53 and the process is repeated. A torus of oil is produced on each side of the impeller 52 and this absorbs energy by converting the kinetic flow energy into heat energy via turbulence losses.

When only a small amount of oil is in the system, there is insufficient pressure built up in the flow circuit 118 to force the oil back in along fixed vanes 56 and 56a and the oil accordingly continues around circuit 118 and exits through outlet port 20, as indicated by arrows 122 (FIG. 2). It is to be noted that an oil passage leading to exit port 20 flows down through a restricting passageway 124 (FIG. 4), a portion of which is formed by a partition 126, the oil flowing into a retarder cavity 128 with a baffle 130 therein and thence to the outlet port 20. The details of this construction are shown in FIG. 4 of the drawings. The cavity 128, in conjunction with partition 126 and passageway 132, provide the separation of air, which might be trapped in the oil, permitting it to gravitate up and be expelled back into the middle of the retarder. The oil flows out from cavity 128 through the port 20 to the cooler, back through port 30 and thence into the clutch housing through passage 106, or the secondary passage 110 which opens when the primary passage is closed by application of the brake 102.

With the foregoing basic structure, the following method of controlling the quantity of oil in the clutch and retarder will be described. As most clearly shown in FIG. 4 the oil sump 58 is filled through a removable filler plug 136, to which is affixed a dip stick 138. The bottom of the dip stick extends down into the oil in sump 58. Oil in the sump is filled to maintain a level indicated at 142, which is a running level. The level is somewhat lower with the engine in stopped or non-operating condition. In operation, with the plug 136 tightly seated, the sump 58 is completely enclosed except for passage through a valve seat 144, which is of resilient material. The sump is connected through the valve seat 144 to the retarder outlet cavity 128.

When air from a pressure regulating control device, not shown, is admitted through port 146, generally indicated by a feeder pipe or conduit and designated "air pressure to control volume of sump oil to clutch-retarder" in FIG. 4, then the oil if forced out of the sump portion of the housing, through seat 144, and into cavity 128 from which it can enter directly into the retarder, or alternatively, flow through the cooler, through the inlet 30, passageway 106 and exit port 20 for cycling through the cooling circuit 16.

As the quantity of oil in the retarder flow circuit 118 increases, the pressure in circuit 118, passage 124, cavity 128 and at exit port 20 increases until a static equilibrium is produced between the pressure in cavity 128 and the pressure in sump 58. Consequently, for any given engine speed, it is necessary only to control sump pressure in order to establish and maintain a desired level or amount of braking capability. Increasing the air pressure in sump 58 serves to increase the quantity of oil in the circuit primarily in the flow areas along the impeller blades 53 and the fixed vanes 56 and 56a, and thus the retarding capability is increased. Conversely, a reduction in the pressure serves to reduce the oil quantity in the circuit 118 and therewith the retarding capability. If the air pressure is completely relieved this allows the system to return to a non-retarding equilibrium, with a small static head from the sump 58 serving to maintain sufficient oil in the retarder to be pumped through the system, and this resulting low rate of oil flow serves for cooling and lubrication of the clutch.

When the quantity of oil is increased in cavity 118, air is forced out through breather 34 which connects directly into housing 22 via the air vent cavity 114 as shown on FIG. 3. The air vent cavity allows separation of oil droplets from the air entering through passages 133 before escaping through the breather. The breather maintains atmospheric pressure in housing 22 and at the inner diameter of impeller blades 53.

For any given sump pressure, reducing impeller speed will tend to reduce the pressure at flow circuit 118, passage 124, cavity 128, and exit port 20. Greater pressure in the sump 58 will cause more oil to flow into the retarder until the pressures are again in equilibrium. This results in automatic response which will tend to give a constant retarding torque, even with varying speeds for any given control pressure.

If the engine is not running, and therefore the impeller is stationary, the possibility of forcing all of the oil into the retarder and letting air escape from the sump is prevented by means of ball type float valve 148, shown seated on valve seat 144 in phantom lines, and shown raised off of the seat in full lines at 148a. The passageway from sump 58 that discharges through seat 144 is indicated at 150, and passageways 152 from the seat 144 into the cavity at discharge port 20, the flow being indicated by dash line arrows at 154. The float valve ball 148 drops along with the oil level, and upon contacting seat 144 serves to shut off further escape of oil or air from sump 58. Drain plug 156 contains the passages 152, which are drilled therein, to provide for connecting sump 58 with retarder cavity 128 as pointed out above. The drain plug 156 also serves to positionally maintain valve seat 144. If the system is pressurized during non-rotation of the engine, retarder oil is expelled into the retarder system to that point where the float 148 shuts off further flow as hereinbefore described. If, however, the air pressure is relieved from sump 58, oil will be freely pumped back into the sump by means of the impeller while cranking and starting the engine.

It will thus be seen that the apparatus provides a simple and relatively uncomplicated retarder and its control means. The retarder is efficiently and simply combined with the clutch so as to provide oil cooling to thereby reduce wear and maintenance, as also to reduce initial manufacturing costs.

In those applications requiring a flywheel clutch, an oil-cooled clutch is provided integrally such that the retarder impeller supplies a flow of cooling oil through the clutch. When the clutch is disengaged, and the clutch brake is contacted to stop rotation of the clutch output member, this same operating action serves to cut off the oil flow, thus reducing viscous drag at the clutch. Also, as pointed out, the amount of retardation is controlled simply by varying the amount of oil which is present in the housing or sump, and accordingly, that within the retarder circuit itself.

While some structural details have not been described in depth, the retarder flow circuit 118, impeller blades 53 and fixed vanes 56 and 56a are shown in great detail in the above mentioned Clark et al. U.S. Pat. No. 3,490,567, and Johnson U.S. Pat. No. 3,352,385, and which patents as aforementioned disclose and describe a so-called brakesaver mechanism in the nature of a hydrokinetic brake, and used in conjunction with several truck engines and vehicles produced by the assignee company.

While a preferred embodiment has been shown and described, there are certain alternatives which are applicable and which will be broadly described hereinafter. Specifics concerning these are not included in the present application.

Normally, although not shown, it would be necessary to provide a control connected to the clutch actuation system and which would be operated by air or hydraulic pressure. Functionally, this would discharge air from the reservoir 58 whenever the clutch is disengaged. This would allow the operator of a vehicle having a clutch-retarder combination of the invention to pressurize the retarder and yet have it automatically depressurize while shifting the transmission, and thus not seriously affect engine speed by retardation.

Another feature could include an automatic mode such as currently used in the aforementioned "brakesaver" apparatus. In the automatic mode, the manual or automatic function being chosen by an operator, whenever the accelerator pedal is completely released, the control would admit air pressure at a regulated level to the retarder, into inlet port for air 146, and as soon as the accelerator pedal is slightly depressed, it will release the pressure, thus allowing the retarder to be intermittently on or off as desired by the operator.

Another means of controlling retarding capability of apparatus, not shown, would be a system having a pump which would continuously pump cooling oil from a sump to the clutch. The pump could be driven from a gear on the clutch cover and be mounted on the retarder housing, the structure being similar to clutch cover 50 and the retarder housing 22. The oil could flow at a rate of, for example, 10 to 20 gallons per minute for normal clutch cooling purposes. Oil would be freely expelled by the impeller so as to flow through the cooler circuit and back to sump. To incorporate retarding when desired, an air operated valve could be incorporated which would momentarily cause oil to build up in the retarder until equilibrium pressure is reached, and at that time the valve would begin to bypass the oil back to the sump, while maintaining a fixed quantity in the retarder circuit. An advantage of such a system would be a reduced volume of air needed to control the retarder as compared to one which directly pressurizes the oil in the sump.

If a serious aeration problem arises in the structure as above shown and described, additional means could be used to remove air from the retarder circuit. One such deaeration method could be to provide passages into the central portions of fixed vanes 56 and 56a. In operation, the oil would be centrifuged to the outer periphery of each torus, leaving the air in the center where it can flow out through the passages.

Another modification which could be incorporated for control of the clutch would be to use mechanical means rather than the piston 92 as shown.

While a preferred embodiment is shown and described hereinabove, manifestly minor changes in details of structure can be effected without departing from the spirit and scope of the invention as defined in, and limited solely by, the appended claims.

What is claimed is:

1. A hydrodynamic retarding brake and clutch apparatus comprising:
   a clutch (72) having an engaged condition and a disengaged condition;
   a housing (22) containing said clutch (72) and containing a fluid;
   a rotatable shaft (32) operatively associated with said clutch; and
   retarding means (52) in fluid communication with said clutch (72) for pumping said fluid through said clutch (72) for the cooling thereof and for retarding rotation of said shaft (32).

2. The hydrodynamic retarding brake and clutch apparatus as set forth in claim 1 wherein said retarding means (52) includes a retarder-impeller.

3. The hydrodynamic retarding brake and clutch apparatus as set forth in claim 17 wherein said clutch (72) includes at least one driving plate (76) and at least one driven plate (74), said driven plate (74) being connected to said rotatable shaft (32) and said driving plate (76) being adapted to be connected to means (10,38) for driving said driving plate (76), said hydrodynamic retarding brake and clutch apparatus further including means (146) for substantially preventing said retarder-impeller (52) from retarding rotation of said driving plate (76) in response to said clutch (72) being in said disengaged condition.

4. The hydrodynamic retarding brake and clutch apparatus as set forth in claim 17 including a flywheel (38) connected to said clutch (72), said flywheel (38), clutch (72) and retarder-impeller (52) all being disposed in communicating relation within said housing (22).

5. The hydrodynamic retarding brake and clutch apparatus as set forth in claim 1 including means (92,96,102) for interrupting said fluid to said clutch (72) in response to said clutch (72) being in said disengaged condition.

6. The hydrodynamic retarding brake and clutch apparatus as set forth in claim 1 including brake means (92,96,102) for applying braking action to said clutch (72) in response to said clutch (72) being disengaged.

7. The hydrodynamic retarding brake and clutch apparatus as set forth in claim 6 wherein said brake means (92,96,102) for applying braking action to said clutch (72) also serves to interrupt said fluid to said clutch (72) in response to said clutch (72) being in said disengaged condition.

8. The hydrodynamic retarding brake and clutch apparatus as set forth in claim 1 wherein said retarding means (52) in fluid communication with said clutch (72) is located within said housing (22).

9. The hydrodynamic retarding brake and clutch apparatus as set forth in claim 1 including means (146) for selectively altering the rate at which rotation of said shaft (32) is retarded.

10. The hydrodynamic retarding brake and clutch apparatus as set forth in claim 9 wherein said means (146) for selectively altering the rate at which energy is dissipated includes a pressure regulating device operative to pressurize said fluid in said housing (22).

11. The hydrodynamic retarding brake and clutch apparatus as set forth in claim 10 wherein said housing (22) defines a sump (58).

12. The hydrodynamic retarding brake and clutch apparatus as set forth in claim 1 wherein said retarding means (52) in fluid communication with said clutch (72) is mechanically connected to said clutch (72) and conjointly rotatable therewith.

13. A hydrodynamic retarding brake and clutch apparatus comprising:
    first and second members (38,32);
    clutch means (72) for selectively connecting said first and second members (38,32);
    a housing (22) defining a sump (58) having a predetermined volume of a fluid therein and containing said clutch means (72); and
    impeller means (52) engageable with said fluid selectively for hydrodynamically retarding one of said members (38,32) and for pumping the fluid through said clutch means (72) for cooling purposes.

14. The hydrodynamic retarding brake and clutch apparatus as set forth in claim 13 wherein said second member (32) is a rotatable shaft and said hydrodynamic retarding brake and clutch further including means (146) for substantially preventing said retarder impeller (52) from retarding rotation of said first member (38) in response to said shaft (32) being free from connection to said first member (38).

15. The hydrodynamic retarding brake and clutch apparatus as set forth in claim 13 including means (92,96,102) for applying braking action to said clutch means (72) and also for interrupting said fluid to said clutch (72) in response to braking action.

16. The hydrodynamic retarding brake and clutch apparatus as set forth in claim 13 wherein said impeller means (52) is located in said housing (22).

17. The hydrodynamic retarding brake and clutch apparatus as set forth in claim 16 wherein said impeller means (52) is connected to one of said first and second members (38,32) for rotation therewith.

18. The hydrodynamic retarding brake and clutch apparatus as set forth in claim 17 wherein said second member (32) is a rotatable shaft and said hydrodynamic retarding brake and clutch further including means (146) for substantially preventing said retarder impeller (52) from retarding rotation of said first member (38) in response to said shaft (32) being free from connection to said first member (38).

19. A combined hydrodynamic retarding brake and oil cooled driveline flywheel clutch, comprising: a housing, an oil sump in said housing, a rotatable retarding brake impeller (52), a retarder flow circuit (118), said clutch (72) being integral with said brake impeller (52), cooling means (16), the amount of retardation being controllable by varying the amount of oil in said retarder flow circuit, said retarder impeller (52) being operable, upon rotation, to simultaneously retard driveline speed and to supply a flow of cooling oil through said clutch and cooling means, means to increase the pressure of the oil in the flow circuit (118) with such increased pressure increasing the retarding braking force in said retarder circuit, and a clutch brake (102) operable to apply a braking action to said clutch output member as said clutch is disengaged thereby operating to stop clutch output, actuation of said clutch brake also operating to cut off and bypass oil flow to the clutch mechanism whereby viscous drag at the clutch is reduced while oil flow bypassing said clutch is pumped out of said housing.

20. A hydrodynamic retarding brake and oil cooled driveline clutch system comprising a housing (22) operably containing said clutch (72), an oil sump (58) in said housing, said retarding brake including a retarder impeller (52), said clutch and said impeller being integral and portions thereof being conjointly rotatable, a clutch cooling oil circuit, a clutch (102,104), said retarder impeller upon rotation supplying a flow of cooling oil to and through said clutch, and a retarder flow circuit (118), said impeller being operable during normal functioning of said clutch to impel oil through said cooling oil circuit for clutch and retarder cooling and through said retarder circuit to increase or decrease the amount of retardation, actuation of said clutch brake to retard normal functioning of said clutch blocking off and bypassing cooling oil flow to said clutch with oil bypassing said clutch being pumped out of the housing by said retarder impeller 52.

21. A hydrodynamic retarding brake and oil cooled driveline clutch system comprising, a housing (22) operably containing said clutch (72), an oil sump (58) in said housing, said retarding brake including a retarder impeller (52), said clutch and said impeller being integral and portions thereof being conjointly rotatable, a clutch cooling oil circuit, said impeller upon rotation supplying a flow of cooling oil to and through said clutch, a retarder flow circuit (118), said impeller being operable to impel oil through said cooling oil circuit for clutch and retarder cooling and through said retarder circuit to increase or decrease the amount of retardation, said housing (22) constituting a multi-function housing, an engine flywheel housing (36), an engine flywheel (38) in said flywheel housing (36), a transmission input shaft (32), a clutch hub (66) splined to said input shaft, a clutch cover (50) having a sleeve portion (86) operatively connected with said clutch hub, a clutch throw-out collar (84), an annular clutch piston (92) operably engaging said throw-out collar for displacement of said collar, interengaging clutch disc means (74,76) operatively connected with said clutch hub and said flywheel, a pressure plate (78) operatively engageable with said clutch plates, levers (80) pivotally connected to said clutch cover (50) and pivotal through movement of said throw-out collar (84) to frictionally interengage said plates, concentric springs (88A,88B) interposed between said clutch cover (50) and said throw-out collar (84), said throw-out collar (84) bearing against the inner ends (80B) of said levers (80), said concentric springs providing plate load on the clutch by pressing between the cover (50) and throw-out collar (84) when the clutch is functionally operating, said concentric springs (88) being compressed when said clutch is released, thereby relieving load on said levers, and tension springs (90) interconnected between the pressure plate and the clutch plates, including an annular clutch piston (92) movably engageable with bearings (94) for said throw-out collar (84), pressure means applicable to said clutch piston for movement thereof, said clutch piston serving, upon movement, to move said collar toward said flywheel to cause clutch disengagement, said clutch hub (66) having a rearward faced conical nose (104) thereon, a clutch brake including a conical nose portion (102) engageable with said conical nose portion (104) on said hub, said clutch brake being operatively associated with said clutch piston (92) and movable therewith for bringing into engagement with two conical shaped portions, and wherein movement of said piston a sufficient distance to disengage said clutch and contact said conical nose portions serves for applying a braking action to slow rotation of the clutch output members to aid in shifting gears within a transmission, a retarder flow circuit outlet cavity for receiving fluid from said circuit, said sump (58) having an opening (150) and a space with a valve seat (144) through which the retarder outlet cavity is connected, air pressure admitting port means (146) to said sump (58), and pressure regulating control means for controlling admission of pressurized air connected to said port (146) operable to cause oil to be admitted through the seat and into the cavity (128) from which it can enter directly into the retarder or through the cooler and thence into the retarder, an increase of oil quantity in said retarder operating to increase pressure in said circuit (118) and therefore at the exit port until static equilibrium is produced between the pressure in said cavity and the pressure in the sump, control of sump pressure for any given engine speed maintaining a particular level of braking capability.

22. A hydrodynamic retarding brake and oil cooled driveline clutch system operatively connected to a driven engine comprising, a housing (22) operably containing said clutch (72), an oil sump (58) in said housing, said retarding brake including a retarder impeller (52), said clutch and said impeller being integral and portions thereof being conjointly rotatable, a clutch cooling oil circuit, said impeller upon rotation applying a flow of cooling oil to and through said clutch, a retarder flow circuit (118), said impeller being operable to impel oil through said cooling oil circuit for clutch and retarder cooling, and through said retarder circuit to increase or decrease the amount of retardation, a retarder flow circuit (118) outlet cavity (128) for receiving fluid from said circuit, said sump (58) having an opening (150) and a space with a valve seat (144) through which the retarder outlet cavity is connected, air pressure admitting port means (146) to said sump (58), and pressure regulating control means for controlling admission of pressurized air connected to said port (146) operable to cause oil to be admitted through the seat and into the cavity (128) from which it can enter directly into the retarder or through the cooler and thence into the retarder, an increase of oil quantity in said retarder operating to increase pressure in said circuit (118) and therefore at the exit port until static equilibrium is produced between the pressure in said cavity and the pressure in the sump, control of sump pressure for any given engine speed maintaining a particular level of braking capability.

23. A system as claimed in claim 22 including a float valve (148) contactable with said seat (144) for shutting off escape of air from the sump (58) a drain plug (156) having drilled passages therein in said space proximate said seat (144) and serving to maintain said seat in position, said system, is pressurized during non-rotation of the engine and retarder, allowing oil expellation into said retarder system only to a point wherein the oil level drops to where said float shuts off further flow.

* * * * *